United States Patent
Eckert et al.

(10) Patent No.: US 6,461,153 B2
(45) Date of Patent: Oct. 8, 2002

(54) METHOD FOR DESULFURIZATION OF OFF-GASES OF A SYSTEM FOR THE MANUFACTURE OF CEMENT CLINKER

(75) Inventors: Carsten Eckert; Andreas Hand, both of Cologne; Norbert Streit, Siegburg; Stephan Kuhnke, Erftstadt, all of (DE)

(73) Assignee: KHD Humboldt Wedag AG, Cologne (DE)

( * ) Notice: Subject to any disclaimer, the term of this patent is extended or adjusted under 35 U.S.C. 154(b) by 0 days.

(21) Appl. No.: 09/930,556

(22) Filed: Aug. 15, 2001

(65) Prior Publication Data

US 2002/0071801 A1 Jun. 13, 2002

(30) Foreign Application Priority Data

Aug. 17, 2000 (DE) ........................................ 100 40 163

(51) Int. Cl.[7] .................................................. C04B 2/10
(52) U.S. Cl. ..................... 432/14; 106/752; 423/244.01
(58) Field of Search ............................. 432/14, 15, 58; 106/739, 752, 761, 771; 423/244.01

(56) References Cited

U.S. PATENT DOCUMENTS 4,634,583 A * 1/1987 Wolter et al. ............... 106/752
4,715,811 A * 12/1987 Lawall ........................ 432/58
5,049,198 A * 9/1991 Ribas .......................... 432/14

FOREIGN PATENT DOCUMENTS

EP          0497937          8/1991

* cited by examiner

Primary Examiner—Gregory Wilson
(74) Attorney, Agent, or Firm—Charles L. Schwab; Nexsen Pruet Jacobs & Pollard, LLC

(57) ABSTRACT

A system for the manufacture of cement clinker from cement raw meal in which the off-gases of the cement clinker production line not only undergo denitrification but also undergo desulfurization, so that even sulfur-rich raw materials and fuels can be employed without exceeding the prevailing pollutant emission limits. A substream of the oversize material (30) discharged from the mixing chamber (29) of the precalcination stage (16) as solid sorbent may be combined with the off-gas (22) and/or with a partial gas discharge (38) of the rotary kiln off-gas in order to convert the sulfur oxides contained in those off-gases to calcium sulfate (34), which is subsequently separated from the system off-gas.

5 Claims, 1 Drawing Sheet

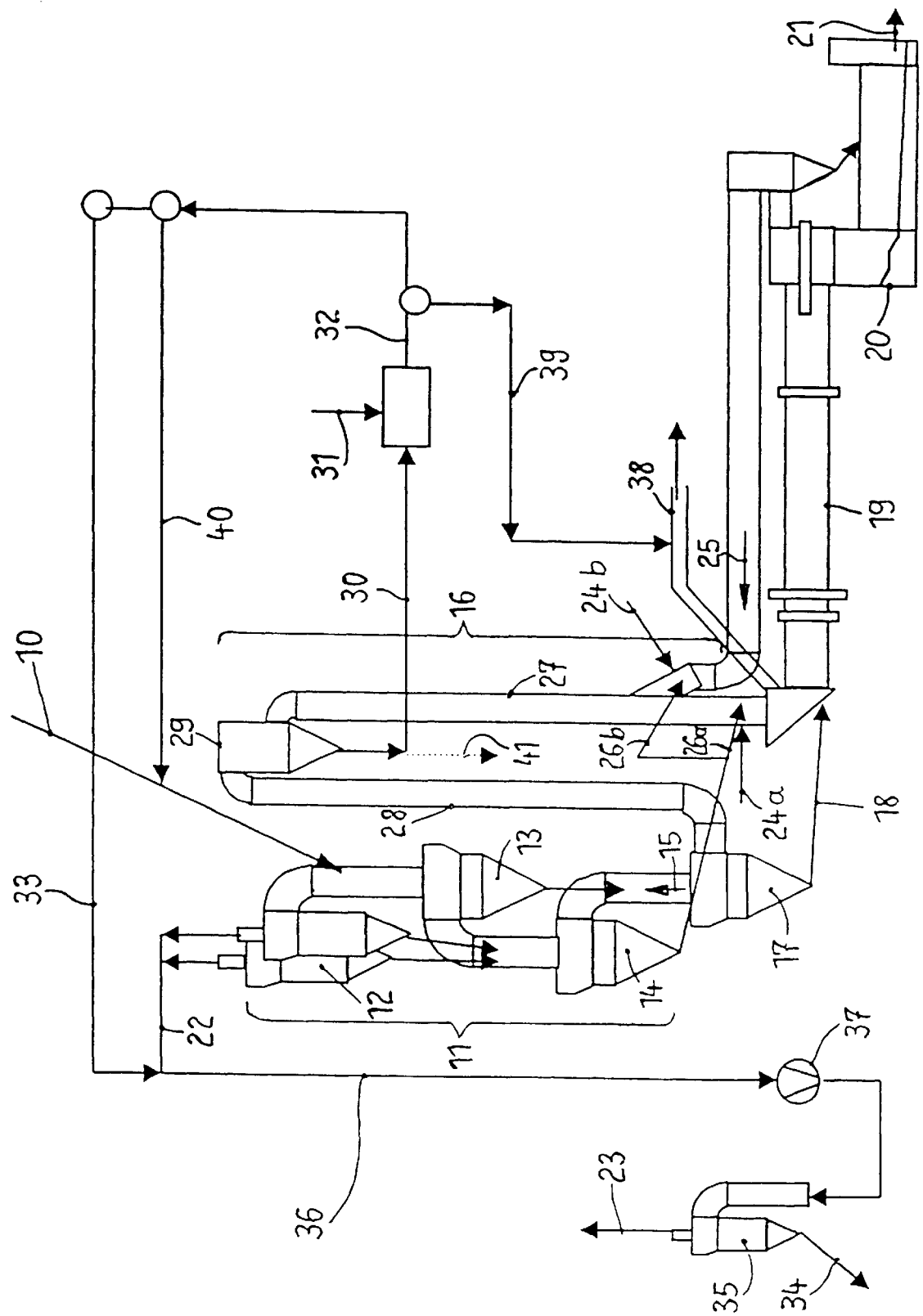

METHOD FOR DESULFURIZATION OF OFF-GASES OF A SYSTEM FOR THE MANUFACTURE OF CEMENT CLINKER

TECHNICAL FIELD

This invention relates to a method for desulfurization of off-gases of a system for the manufacture of cement clinker from raw meal, having a raw meal preheater, a precalcination stage, a rotary kiln and a clinker cooler.

BACKGROUND OF THE INVENTION

In systems for the manufacture of cement clinker from cement raw meal, in order to avoid rotary kilns that are uneconomically long and/or large in diameter and to keep the specific heat requirement of the cement clinker manufacturing process low, it is known to connect, upstream of the rotary kiln as viewed in the direction of material flow, a precalcination stage that is equipped with at least one secondary firing system in addition to the firing system in the rotary kiln. In the cement clinker facility shown in European patent stage EP-B-0 497 937 issued May 10, 1995 to A. Wooten et al, the rotary kiln off-gas riser is supplied with fuel and preheated raw meal. The gas-solid suspension conveyed in the off-gas riser is diverted by 180° and, in combination with at least one substream of tertiary air coming from the clinker cooler, is inlet to the lowermost cyclone of the cyclone suspension preheater system with the aim of separating the highly precalcined raw meal from the gas stream. The fuel inlet to the rotary kiln off-gas riser is burned in richer than stoichiometric fashion, that is, with a deficiency of oxygen, in at least one $DeNO_x$ burner in order to create a CO-containing reduction zone or CO gas strand for the reduction of the pollutant or thermal $NO_x$, which is formed in particular by high-temperature combustion in the rotary kiln, while the fuel inlet to the adjacent tertiary air duct is burned in leaner than stoichiometric fashion, that is, with an excess of oxygen. The CO not consumed in the $DeNO_x$ reduction zone of the rotary kiln off-gas duct and any solid fuel particles not burned in the precalcination stage are then, downstream as viewed in the direction of suspension flow, post-combusted with an excess of oxygen from the tertiary air duct. A swirl chamber or mixing chamber for separation of the oversize fractions from the gas-solid suspension is arranged in the region of a 180° flow deflection of a gooseneck-shaped precalcination stage for the purpose of intensive mixing of the reactants in order to promote this residual burnout. In the known precalcination stage, the oversize fractions carried out of the mixing chamber are inlet to an ascending pipeline branch and/or into a descending pipeline branch of the precalcination stage.

Besides the requirements for precalcination of the cement raw meal to the highest possible degree before inlet to the rotary kiln and for low off-gas emission values with respect to the pollutants $NO_x$ and CO, builders and operators of cement clinker production lines simultaneously face increasingly stringent requirements for low emission values with respect to the pollutant $SO_x$, such as for example $SO_2$. Maintaining low emission values becomes increasingly difficult when the cement raw materials contain large amounts of pyritic sulfur or sulfide minerals and/or when sulfur-containing fuels/secondary fuels are employed. The mostly pyritic sulfur, from pyrite, marcasite, etc., is reacted to $SO_2$ in the upper cyclone stages of the cyclone suspension heat exchanger system at temperatures of roughly 300 to 700° C. and is chiefly responsible for the $SO_x$ emissions measured in the off-gas of the cement clinker production line.

Desulfurization of the off-gas of a cement clinker production line is shown in U.S. Pat. No. 4,634,583 issued Jan. 6, 1987 to A. Wolter et al for a Method for the Desulfurization of Flue Gas of a Firing System. A substream from the CaO-containing hot meal being conveyed into the rotary kiln feed chamber from the lowermost cyclone of the cyclone suspension heat exchanger system, is cooled, slaked with water if appropriate, and inlet to a reaction chamber arranged in the off-gas tract of the cement clinker production line in order to immobilize the gaseous sulfur oxides as calcium sulfate. The calcium sulfate is separately recovered from the off-gas before subsequent off-gas treatment, such as by electrostatic dust precipitation, and can be utilized as a gypsum component, in particular as an additive in the grinding of the cement clinker to cement in order to control the setting of the concrete to be fabricated with the cement. Aside from the device for off-gas desulfurization, this known cement clinker production line does not have a device for off-gas denitrification with a $DeNO_x$ burner, nor does it even have a mixing chamber arranged in the flow deflection region at the highest point of the gooseneck-shaped precalcination stage and still within the precalcination stage itself in order to promote the residual burnout of, in particular, the CO formed in the ascending pipeline branch.

OBJECTS AND SUMMARY OF THE INVENTION

It is an object of the invention to make sure that the off-gases of the cement clinker production line not only undergo denitrification but also undergo desulfurization in an economical fashion, so that, for example, even pyritic raw materials and/or sulfur-rich fuels/secondary fuels can be employed without posing the danger of pollutant emission limits being exceeded.

In this invention a substream of the oversize material is discharged from an outlet of a mixing chamber at the highest point of a gooseneck-shaped precalcination stage. This substream of oversize material is inlet as solid sorbent to the off-gas downstream of its discharge from the cyclone suspension heat exchanger system. A substream of such solid sorbent may be inlet to a partial gas discharge of the rotary kiln off-gas—provided the cement clinker production line is equipped with a bypass gas discharge or partial gas discharge for the purpose of reduction of pollutant circulations such as alkali circulations and sulfur circulations. The solid sorbent converts the sulfur oxides contained in the off-gas to calcium sulfate, which is subsequently recovered from the off-gas stream or from the partial gas discharge stream.

The CaO-containing oversize material outlet from mixing chamber in the precalcination stage can, before its use as solid sorbent, be at least partly converted to highly reactive lime hydrate $Ca(OH)_2$ for the purpose of increasing its reactivity by the addition of water, and thus also cooled, to a temperature of, desirably, about 280 to about 360° C., which is, the temperature at which the off-gases of the cement clinker production line exit from the top of the cyclone suspension heat exchanger system.

Because the mixing chamber, placed at the highest point in the deflection region of the gooseneck-shaped calcination stage, is already positioned very high in the tower building of the suspension heat exchanger system, only a little lifting work need be done in order to convey the CaO-containing oversize material dropping out in the mixing chamber or, after conversion, the lime hydrate, to the point at which this solid sorbent is injected into the off-gas line coming from the heat exchanger system, so that a very long path, extending practically over the entire structural height of the cyclone suspension heat exchanger system, is available for the accomplishment of the gas desulfurization reaction. This off-gas line runs from the uppermost heat exchanger cyclone downward to the off-gas induced draft fan installed on the foundation. The long path of the off-gas desulfurization reaction, for example 40 to 50 meters, makes possible a high degree of off-gas desulfurization.

Because the oversize material dropping out from the vortex in the mixing chamber, which is discharged as solid sorbent from the deflection region of the precalcination stage, has a particle-size distribution in a range from about 50 to about 500 micrometers, the still finer particle-size fractions ordinarily also dropping out from the gas-solid suspension in a conventional cyclone separator not dropping out in the mixing chamber used in the method according to the invention, it becomes possible that the $SO_x$-laden solid sorbent, primarily $CaSO_4$, can be largely recovered separately from the off-gas by a cyclone separator before the desulfurized off-gas is subjected to particulate removal in a fine particulate removal device, in particular an electrostatic dust collector. The $CaSO_4$ recovered from the off-gas may be used as gypsum for flue-gas desulfurization systems, used as an additive for cement clinker grinding, and/or added to the cement raw meal.

BRIEF DESCRIPTION OF THE DRAWING

An exemplary embodiment of the invention is shown schematically in the accompanying drawing.

DETAILED DESCRIPTION OF THE INVENTION

The drawing illustrates a system for the manufacture of cement clinker from cement raw meal 10. The cement raw meal is fed into a preheating stage 11 at the top, where it passes in succession through cyclone suspension heat exchangers 12, 13, 14 in combined cocurrent/countercurrent relation to hot off-gas 15 of a precalcination stage 16. The raw meal is recovered from the hot off-gas stream 15 in the lowermost cyclone 17 and inlet, as highly concentrated calcined cement raw meal 18, to an inlet chamber of a rotary kiln 19, in the sinter zone in which it is burned to cement clinker. The cement clinker is subsequently cooled in a clinker cooler 20, for example a grate cooler. The cooled cement clinker exits the cooler 20 at 21.

The off-gas cooled against the cement raw meal exits the preheating stage 11 at 22 at a temperature level of roughly 280 to 360° C. This off-gas 22, after flowing through an off-gas desulfurization system to be described hereinafter, is conveyed by a line 23 to a dust separator, not shown, such as an electrostatic dust collector or electrostatic precipitator, in which the off-gas is freed of particulate matter. The off-gas is subsequently discharged as treated off-gas via a main stack, not shown.

In the precalcination stage 16, which is supplied with fuel 24a, 24b and tertiary air 25 of clinker cooler 20, preheated cement raw meal 26a, 26b exiting from the next-to-lowermost cyclone stage 14 is calcined to a high degree. In at least one so-called $DeNO_x$ burner in a kiln off-gas riser 27 coming from the rotary kiln 19, fuel 24a is advantageously burned in richer than stoichiometric fashion for the purpose of generating a CO-containing reduction zone for the reduction of the pollutant $NO_x$ contained in the rotary kiln off-gas, while fuel 24b is advantageously burned in leaner than stoichiometric fashion in tertiary air 25 coming from the clinker cooler 20. The residual burnout of the CO initially remaining in excess in the $NO_x$ reduction zone, and any hydrocarbons remaining unburned, can be effected by oxygen from excess tertiary air 25 and, if appropriate, from a further tertiary air substream.

For the purpose of intensive mixing of the reactants in order to promote residual burnout, a further swirl chamber or mixing chamber 29 is arranged in the region of gooseneck-shaped precalcination stage 16 where the flow is deflected by about 180° from ascending pipeline branch 27 into descending pipeline branch 28. The gas-solid suspension is intensively mixed in the mixing chamber 29, which results in complete residual burnout of fuels still present in the ascending branch 27 of the precalcination stage 16. The mixing chamber 29 is designed with a tangential inlet and a tangential outlet of the gas-solid suspension so that it gives rise to only a very slight additional pressure drop. In the mixing chamber 29, part of the oversize material contained in the gas-solid suspension, with a particle size from about 50 to about 500 micrometers, drops out from the suspension and is discharged via line 30.

The oversize material 30 discharged from the mixing chamber 29 of the precalcination stage 16 contains high levels of CaO which is used for the desulfurization of the off-gases of the cement clinker production line. The oversize material 30 is advantageously at least partly converted to highly reactive lime hydrate $Ca(OH)_2$ 32 by the addition of water 31, cooled, and injected as solid sorbent, via line 33, into the off-gas 22 discharged at the top of the cyclone suspension heat exchanger system in order to convert the sulfur oxides contained in the off-gas to calcium sulfate $CaSO_4$ 34, which is separated from the then desulfurized off-gas stream 23 in a cyclone separator 35. Thus the long reaction path of, for example, 40 to 50 meters of off-gas line 36 is available for the off-gas desulfurization reaction. The off-gas line 36 runs downward, over the full height of the tower of the cyclone suspension heat exchanger system, to an off-gas induction fan 37 installed on the foundation.

Thus an off-gas whose emission values with respect to both $NO_x$ and $SO_x$ are minimized is produced by the method of this invention, even when sulfur-rich substances such as pyritic raw materials are used. At the same time, oversize material 30 entering the mixing chamber 29 of precalcination stage 16 is disposed of and utilized in a very beneficial manner, specifically for the dry sorption of cement plant off-gases.

The quantity of solid sorbent 33 to be inlet to off-gas 22 can be controlled by an instrumentation and control system by increasing the quantity of solid sorbent 33 injected as the $SO_x$ ($SO_2$) content of the off-gas increases, and conversely. Excess quantities of sorbent 30 can be recirculated to the raw meal 10 by a line 40 and/or discharged from the process by a line 41.

If the cement clinker production line is further equipped with a bypass gas discharge or partial gas discharge 38 from the rotary kiln inlet chamber in order to reduce alkali circulations and/or internal sulfur circulations, this bypass gas can also be desulfurized by dry sorption by diverting part of the highly reactive sorbent from line 32 and inletting it to the bypass gas 38 via line 39.

The $CaSO_4$-containing solid sorbent 34 separated from the cement plant off-gas 22 and also any loaded solid sorbent obtained from the bypass gas 38 can be added to cement clinker grinding and/or the cement raw meal or otherwise utilized as gypsum for flue-gas desulfurization systems.

What is claimed is:

1. A method for desulfurization of off-gases of a system for the manufacture of cement clinker from raw meal (10), which is preheated in a cyclone suspension heat exchanger system (11) by the off-gas (27) of a rotary kiln (19), calcined in a tubular precalcination stage (16), and burned to cement clinker in the sinter zone of the rotary kiln (19) and subsequently cooled in a downstream clinker cooler (20), the off-gas (27) of the rotary kiln (19) being used in said tubular precalcination stage (16), where fuel is added for calcination of the raw meal and having a mixing chamber (29) in the flow deflection region of the precalcination stage between an ascending pipeline branch and a descending pipeline branch, for separation of oversize material (30) from a gas-solid suspension in order to promote residual fuel burnout, including the step of:

combining at least one substream of said oversize material (30) exiting said mixing chamber (29) of said precalcination stage (16) with off-gas (22) discharged from the cyclone suspension heat exchanger system (11) as a solid sorbent to convert the sulfur oxides contained in said off-gas (22) to calcium sulfate (34), and separating said calcium sulfate from said off-gas (22).

2. The method of claim 1 wherein said oversized material (30) discharged from said mixing chamber (29) contains CaO and further comprising the step of adding water to at least partly convert said CaO to highly reactive lime hydrate $Ca(OH)_2$ (32) and to cool it.

3. The method of claim 1 in which the particle-size of said solid sorbent is between 50 to 500 $\mu$m.

4. The method of claim 1 wherein the quantity of solid sorbent added to said off-gas (22) is increased and decreased in response to increases and decreases in the $SO_x$ content in the off-gas (22).

5. The method of claim 1 and further comprising the steps of adding said $CaSO_4$-containing solid sorbent (34) separated from off-gas (22) to said cement clinker.

* * * * *